(12) United States Patent
Katsaros (10) Patent No.: US 12,259,236 B2
(45) Date of Patent: Mar. 25, 2025

(54) SELF-POSITIONING KICKSTAND FOR A MEASURING WHEEL

(71) Applicant: APEX BRANDS, INC., Apex, NC (US)

(72) Inventor: Anthony Katsaros, Durham, NC (US)

(73) Assignee: Apex Brands, Inc., Apex, NC (US)

( * ) Notice: Subject to any disclaimer, the term of this patent is extended or adjusted under 35 U.S.C. 154(b) by 431 days.

(21) Appl. No.: 17/722,571

(22) Filed: Apr. 18, 2022

(65) Prior Publication Data
US 2022/0333909 A1    Oct. 20, 2022

Related U.S. Application Data

(60) Provisional application No. 63/176,631, filed on Apr. 19, 2021.

(51) Int. Cl.
*G01B 3/12* (2006.01)
*F16M 13/00* (2006.01)

(52) U.S. Cl.
CPC .............. *G01B 3/12* (2013.01); *F16M 13/005* (2013.01)

(58) Field of Classification Search
CPC ....... G01B 3/12; G01B 5/0004; F16M 13/005
See application file for complete search history.

(56) References Cited

U.S. PATENT DOCUMENTS

| | | | | |
|---|---|---|---|---|
| 6,892,470 B2 * | 5/2005 | Olson | ............. | G01B 3/12 33/781 |
| 7,040,036 B1 * | 5/2006 | Wang | ............. | G01B 3/12 33/772 |
| 7,131,216 B2 * | 11/2006 | Nepil | ............. | G01B 3/12 33/772 |
| 8,522,448 B2 * | 9/2013 | Lai | ............. | G01B 3/12 33/772 |
| 8,572,861 B2 * | 11/2013 | Lai | ............. | G01B 3/12 33/779 |
| 10,036,621 B2 * | 7/2018 | Wang | ............. | G01B 3/12 |
| 11,525,657 B2 * | 12/2022 | Cobb | ............. | G01B 3/12 |
| 2007/0084076 A1 * | 4/2007 | Wang | ............. | G01B 3/12 33/772 |
| 2008/0148591 A1 * | 6/2008 | Kao Lin | ............. | G01B 3/12 33/772 |

(Continued)

*Primary Examiner* — Yaritza Guadalupe-McCall
(74) *Attorney, Agent, or Firm* — Burr & Forman LLP (57) ABSTRACT

A support assembly for a measuring device may include a first retention body, a second retention body, and a wire member having a foot portion, legs and engagement members. The foot portion may extend between distal ends of the legs, and the engagement members may extend from respective proximal ends of the legs. The first and second retention bodies may each include a retaining channel extending at least partially therethrough to receive respective ones of the engagement members. The wire member may be operably coupled to the first and second retention bodies to be transitioned between a retracted state and a deployed state in which the foot member is configured to engage ground upon which the measuring device is operable adjacent to a wheel of the support assembly. The legs and the foot portion may be operably coupled to each other such that tension is increased when the wire member is transitioned between the retracted state and deployed state and is lower in one or both of the retracted state and the deployed state.

19 Claims, 6 Drawing Sheets

(56) References Cited

U.S. PATENT DOCUMENTS

| | | | |
|---|---|---|---|
| 2013/0133212 A1* | 5/2013 | Lai | G01B 3/12 |
| | | | 33/203 |
| 2013/0133217 A1* | 5/2013 | Lai | G01B 3/12 |
| | | | 33/782 |
| 2018/0073847 A1* | 3/2018 | Wang | G01B 3/12 |
| 2020/0124392 A1* | 4/2020 | Cobb | G01B 3/12 |
| 2022/0107167 A1* | 4/2022 | Zeller | G01B 5/20 |
| 2022/0333909 A1* | 10/2022 | Katsaros | F16M 13/005 |

* cited by examiner

SELF-POSITIONING KICKSTAND FOR A MEASURING WHEEL

TECHNICAL FIELD

Example embodiments generally relate to measuring devices such as a measuring wheel, and more particularly relate to such devices having an improved kickstand that is self-positioning.

BACKGROUND

Measuring wheels, which are often called a surveyor's wheel or perambulator (among other names), have been in use for many years. In its simplest form, the measuring wheel simply includes a wheel of a known circumference and a handle that extends from the wheel hub to permit a user to walk while holding the measuring wheel to count the revolutions. The number of revolutions of the wheel that occur while measuring a given length can then be multiplied by the known circumference in order to determine the distance traveled. For any fraction of a full turn that is involved in the measurement, the distance corresponding the fraction of the full turn is added to the product of the number of full turns times the circumference.

Over time, means were developed to enable the measuring wheel to display the number of full or partial turns to the user. Then, rather than simply displaying the number of turns, the distance itself began to be displayed to the user at a display that is located either near the hub of the wheel, near the outer circumference of the wheel, or even along the handle at a convenient to read location. The display for distance or revolution counting can also be reset between each measuring operation.

One potential issue with these devices is that, although some two wheel models do exist, a typical model having only a single wheel is not stable for upright storage. Laying such devices down not only causes them to take up more space, but can lead to damage if they are stepped on or if another device falls on them. Meanwhile, if the one-wheeled model is leaned against another object for attempted upright storage, it may easily fall and damage the device if any movement of the device or the object against which it is leaned occurs. Since the one-wheeled models are cheaper to produce, and perfectly adequate measurements are made using them, the one-wheeled models remain most common, and therefore naturally some means by which to store them (either on a short or long term basis) upright have been developed.

Figure 1:
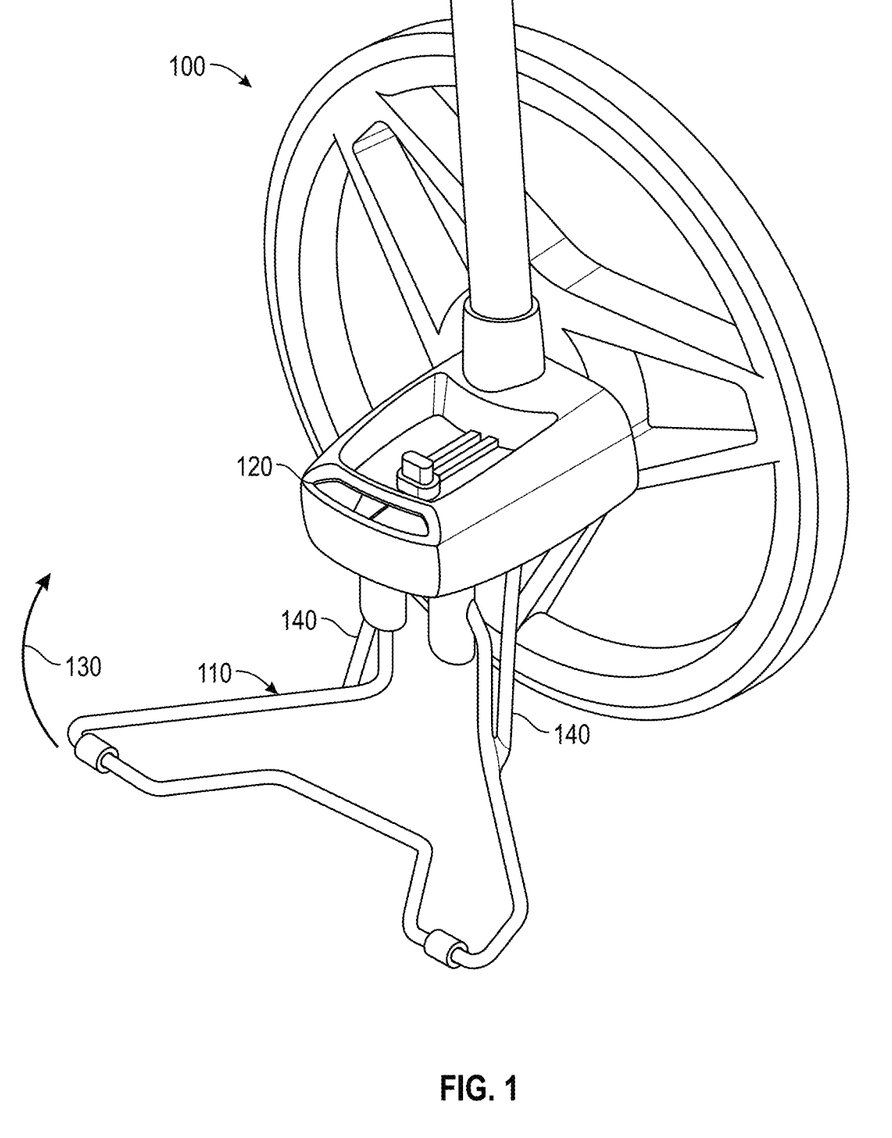
FIG. 1 illustrates a perspective view of a measuring device that is conventional.

In this regard, FIG. 1 illustrates an example of a measuring wheel 100 including such means in the form of a kickstand 110. The kickstand 110 is supported from a housing 120 for the counting means of the measuring wheel 100, which happens to be located proximate to the hub of the measuring wheel 100. Since it is desirable to move the kickstand 110 to a retracted position (instead of the deployed position that is shown in FIG. 1), the kickstand 110 is typically foldable to the retracted position (e.g., in the direction of arrow 130. To retain the kickstand 110 in the deployed position, and to attach the kickstand 110 to the housing 120, an assembly of screws and springs (e.g., springs 140) is normally required. However, each of these components adds cost and complexity to the measuring wheel 100. Thus, it may be desirable to develop lower cost, yet equally functionally capable, designs.

BRIEF SUMMARY OF SOME EXAMPLES

In an example embodiment, a support assembly for a measuring device may be provided. The support assembly may include a first retention body, a second retention body, and a wire member having a foot portion, legs and engagement members. The foot portion may extend between distal ends of the legs, and the engagement members may extend from respective proximal ends of the legs. The first and second retention bodies may each include a retaining channel extending at least partially therethrough to receive respective ones of the engagement members. The wire member may be operably coupled to the first and second retention bodies to be transitioned between a retracted state and a deployed state in which the foot member is configured to engage ground upon which the measuring device is operable adjacent to a wheel of the support assembly. The legs and the foot portion may be operably coupled to each other such that tension is increased when the wire member is transitioned between the retracted state and deployed state and is lower in one or both of the retracted state and the deployed state.

In another example embodiment, a measuring wheel may be provided. The measuring wheel may include a handle, a wheel operably coupled to the handle via a hub assembly, and a support assembly. The support assembly may include a first retention body, a second retention body, and a wire member having a foot portion, legs and engagement members. The foot portion may extend between distal ends of the legs, and the engagement members may extend from respective proximal ends of the legs. The first and second retention bodies may each include a retaining channel extending at least partially therethrough to receive respective ones of the engagement members. The wire member may be operably coupled to the first and second retention bodies to be transitioned between a retracted state and a deployed state in which the foot member is configured to engage ground upon which the measuring device is operable adjacent to a wheel of the support assembly. The legs and the foot portion may be operably coupled to each other such that tension is increased when the wire member is transitioned between the retracted state and deployed state and is lower in one or both of the retracted state and the deployed state.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 2:
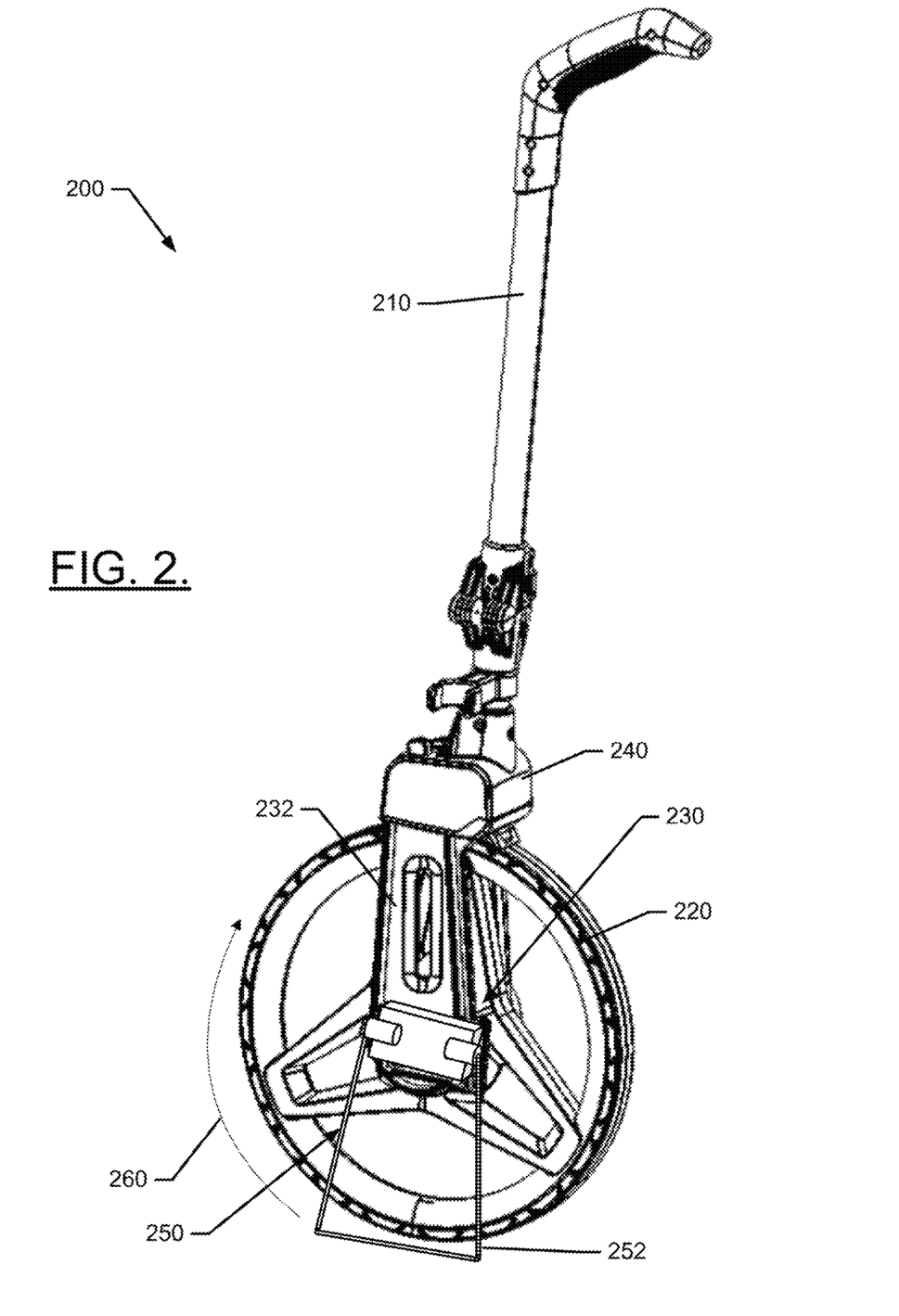
FIG. 2 illustrates a perspective view of a measuring device in accordance with an example embodiment.

As indicated above, some example embodiments may relate to the provision of a measuring device (e.g., a measuring wheel) that may have an improved design for supporting the device in an upright position. Moreover, the improved design is simpler, cheaper, and even more robust than other more complicated designs due to reduced part count and the elimination of exposed parts. FIG. 2 illustrates a perspective view of a measuring wheel 200 according to an example embodiment. In this regard, the measuring wheel 200 includes a handle 210 and a wheel 220 that is operably coupled to the wheel 220 via a hub assembly 230. In this example, the hub assembly 230 is operably coupled to the handle 210 via a fork 232 that extends along both lateral sides of the wheel 220 from the handle 210 to the hub assembly 230. However, such a forked design is not required, and should not be seen as limiting to example embodiments in any way.

The wheel 220 may include spokes that extend away from the hub assembly 230. The wheel 220 may also be configured to interact with measurement assembly 240, which is disposed proximate to the circumferential periphery of the wheel 220 to count revolutions and display distance and/or revolutions of the wheel 220 during a measurement operation.

In this example, a kickstand assembly (or support assembly 250) of an example embodiment is attached to the fork 232 on one side thereof, proximate to the hub assembly 230. However, it should be appreciated that the support assembly 250 could be operably coupled to the measuring wheel 200 in other alternative ways in other example embodiments. In this regard, for example, the support assembly 250 could alternatively be operably coupled to another portion of the fork 232, could be operably coupled to both sides of the fork 232 (e.g., thereby having portions that extend from one lateral side of the wheel 220 to the other lateral side of the wheel 220), or could be operably coupled to a portion of either or both the handle 210 and the measurement assembly 240 (with the further understanding that the location of the measurement assembly 240 may also be moved to different locations on the measuring wheel 200).

The support assembly 250 has a deployed position, which is illustrated in FIG. 2. In the deployed position for this example, a wire member 252 of the support assembly 250 extends to be able to touch the ground adjacent to a lateral side of the wheel 220 to provide at least two contact portions for the measuring wheel 200 including a contact patch on the wheel 220 itself, which touches the ground, and a bottom portion of the wire member 252. The wire member 252 may be rotatable from the deployed position shown in FIG. 2 to a retracted position by rotating the wire member 252 as shown by arrow 260. In the retracted position for this example, the bottom portion of the wire member 252 may end up proximate to a top portion of the fork 232 or the measurement assembly 240.

Figure 3:
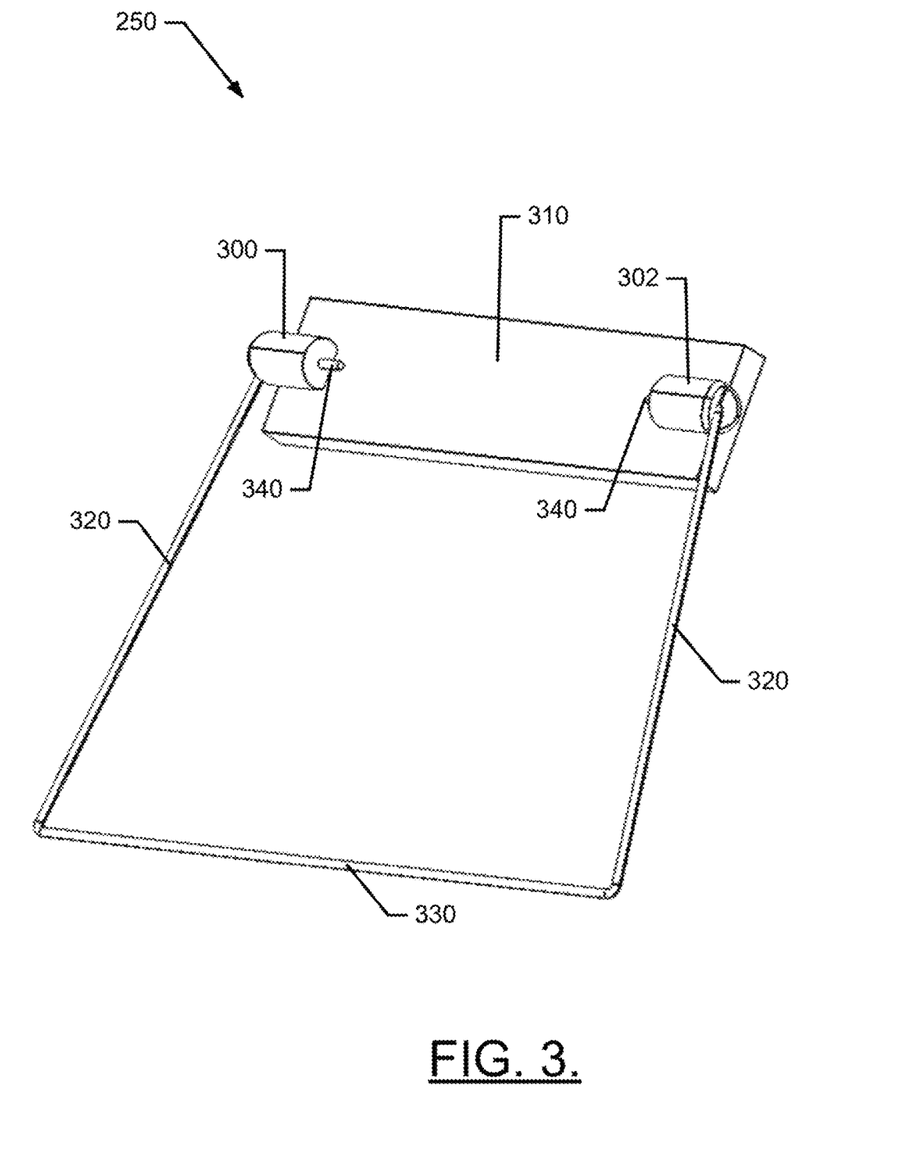
FIG. 3 illustrates a perspective view of a kickstand assembly of the measuring device in isolation in accordance with an example embodiment.
Figure 4:
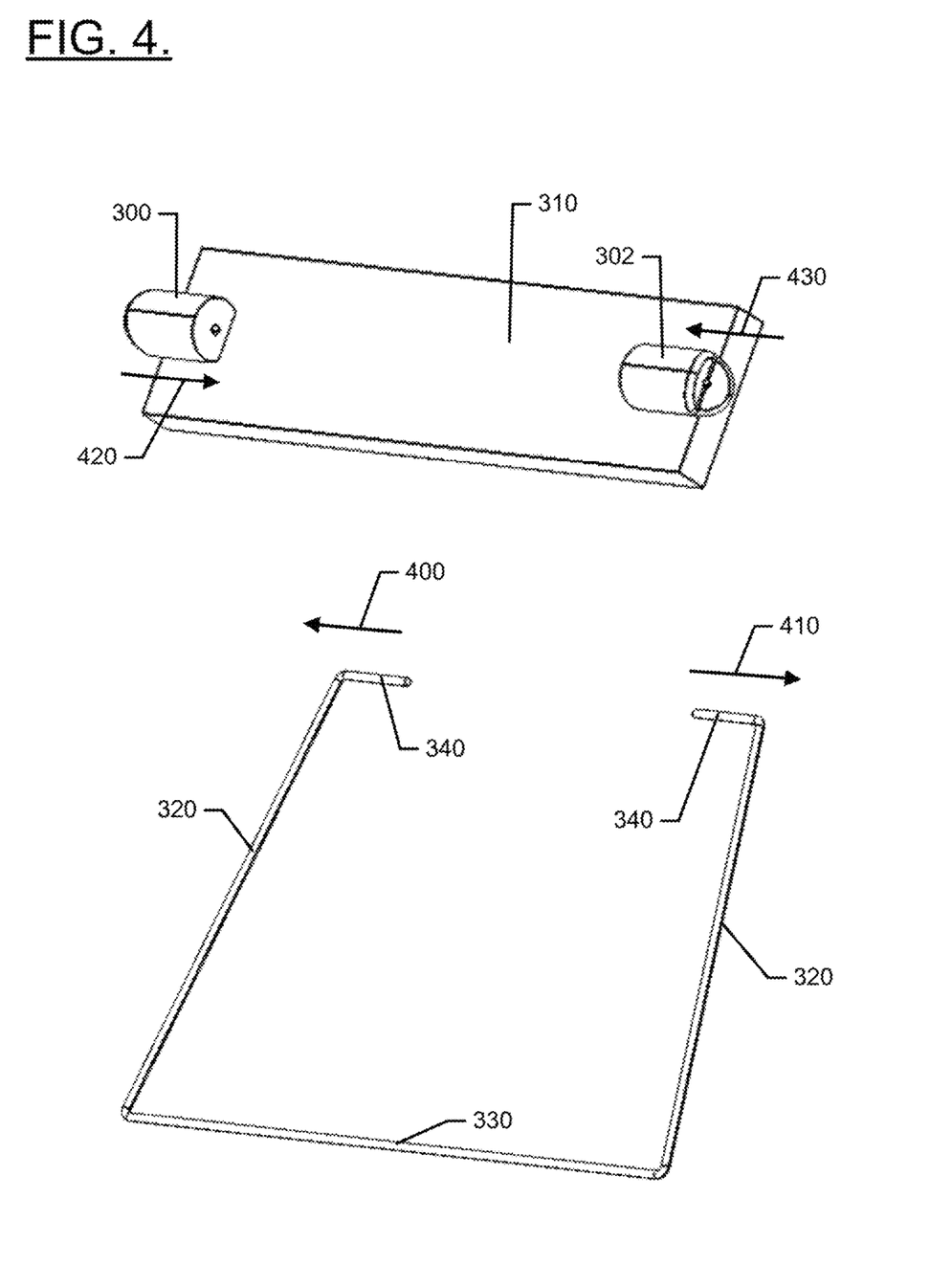
FIG. 4 illustrates an exploded perspective view of the kickstand assembly in accordance with an example embodiment.

The support assembly 250 is shown in greater detail in FIGS. 3 and 4. In this regard, the support assembly includes a retention assembly that includes a first retention body 300 and a second retention body 302. The first and second retention bodies 300 and 302 (or bosses) of this example are mounted on a base 310. The base 310 of this example is in turn operably coupled to the fork 232 of the measuring wheel 200. However, it should be appreciated that the first and second retention bodies 300 and 302 could alternatively be formed directly on portions of one or a pair of the fork 232, the measurement assembly 240, the hub assembly 230, the handle 210 or any other suitable structure of the measuring wheel 200. Thus, the base 310 should more generally be understood to simply represent a mounting structure (or structures) of the measuring wheel 200 and need not necessarily be a separate component of the support assembly 250. Indeed, the first and second retention bodies 300 and 302 could be integrated into any suitable portion of the measuring wheel 200 and need not necessarily be distinct components.

The retention assembly (e.g., the first and second retention bodies 300 and 320) is structured to interface with and retain portions of the wire member 252. In this regard, for example, the wire member 252 may be defined by portions including legs 320, a foot portion 330 and engagement members 340. The foot portion 330 of this example is formed simply as a straight portion of wire that extends between distal ends of the legs 320. It should be appreciated, however, that the foot portion 330 could include bends therein along its length, or may have one or more pieces of rubber or other cushioning material disposed at portions along its length. Moreover, the foot portion 330 could include multiple segments or components that may combine to form the foot portion 330 in some cases. In its simplest form, however, the foot portion 330 may include just a single straight wire portion attached to the distal ends of the legs 330 at opposite ends of the foot portion 330.

Regardless of how the foot portion 330 is shaped, the foot portion 330 may be formed to have a defined and rigid angular relationship with each of the legs 320. In this example, the legs 320 form an acute angle with the foot portion 330, but the acute angle is relatively close to 90 degrees. It is possible to select larger or smaller angles, and the relationship could include either obtuse angles, right angles or smaller acute angles. However, in any case, the angle formed should be relatively rigid. This rigidity will enable the inherent flexibility of the wire member 252 to be advantageously employed to simplify the design, but retain significant effectiveness, as will be discussed in greater detail below, based on the interaction between the engagement members 340 and the first and second retention bodies 300 and 302. The material chosen for the wire member 252 and the gauge of the wire member 252 will typically be selectable to achieve sufficient rigidity to allow a relatively small amount of flexibility of the wire member 252. In its simplest form, the wire member 252 may employ the same gauge wire for each of the legs 330, the foot portion 330 and the engagement members 340.

The engagement members 340 are disposed on opposite ends of the legs 320 relative to the foot portion 330 (i.e., the proximal ends of the legs 320). In this example, the engagement members 340 extend toward each other. The engagement members 340 may also be formed to have a defined and rigid angular relationship with each of the legs 320. In an example embodiment, the engagement members 340 may extend substantially parallel to the foot portion 330. Thus, for example, the angle formed between one of the legs 320 and the foot portion 330 and the angle formed between the one of the legs and the respective one of the engagement members 340 to which it is attached may be supplementary. The engagement members 340 of this example have a length that is slightly larger than a length of the first and second retention bodies 300 and 302. Accordingly, the engagement members 340 may pass entirely through the first and second retention bodies 300 and 302. However, the engagement members 340 could alternatively be shortened to a length that is shorter than the length of the first and second retention bodies 300 and 302, if desired.

In an example embodiment, a distance between opposing ends of the first and second retention bodies 300 and 302 may be about equal to (including being equal to, or just slightly larger or smaller than) a distance between proximal ends of the legs 320. Accordingly, in order to assembly the support assembly 250, the engagement members 340 may need to be forced to spread apart (e.g., with force applied in the direction of arrows 400 and 410). By spreading the engagement members 340 apart (against the rigidity of the angles formed between the legs 320 and the foot portion 330), clearance may be provided to enable the engagement members 340 to be inserted into the first and second retention bodies 300 and 302. The spreading may generate a spring force to oppose the spreading, and the spring forces may be exerted in the directions of arrows 420 and 430 when the engagement members 340 are aligned to be received by the first and second retention bodies 300 and 302.

If the distance between opposing ends of the first and second retention bodies 300 and 302 is equal to or just slightly smaller than the distance between proximal ends of the legs 320, the wire member may be in a rest state when in the deployed position. However, if the distance between opposing ends of the first and second retention bodies 300 and 302 is just slightly larger than the distance between proximal ends of the legs 320, the wire member may be in slightly under tension state when in the deployed position, and may exert forces on the first and second retention bodies 300 and 302 that tend to pinch toward each other as shown by arrows 420 and 430. Either arrangement is possible without limitation for the deployed state. However, the first and second retention bodies 300 and 302 may necessarily be structured to ensure that increasing tension is applied during a transition to the retracted state (or by transitioning from the retracted state to the deployed state). As such, any transition between the retracted and deployed states will cause increased tension on the legs 320 to oppose the transition (e.g., with forces exerted in the direction of arrows 420 and 430).

Figure 5A:
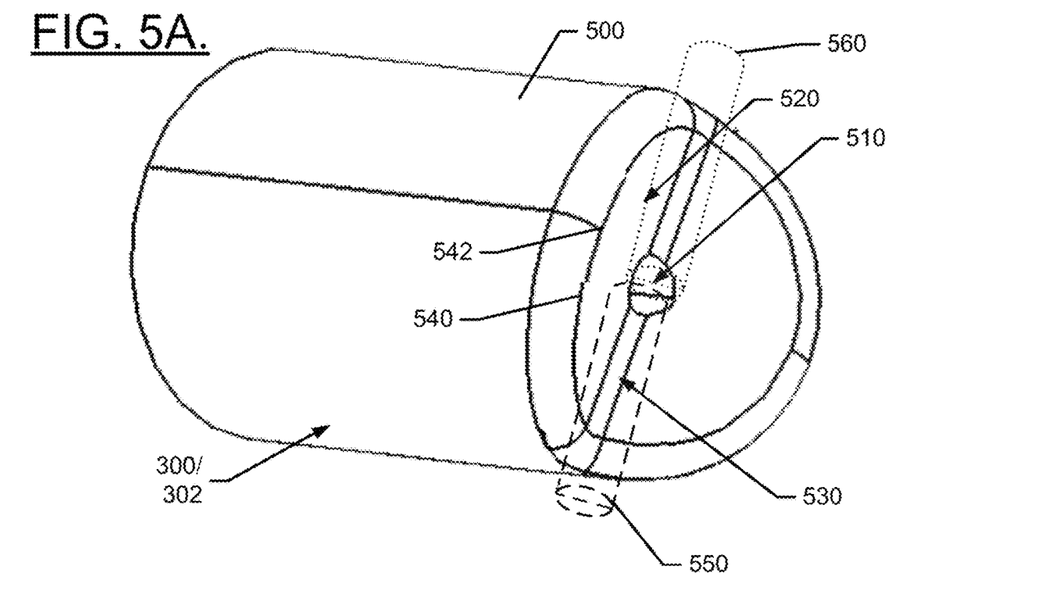
FIG. 5A shows a closer perspective view of a retention body for the kickstand assembly of the measuring device in accordance with an example embodiment.
Figure 5B:
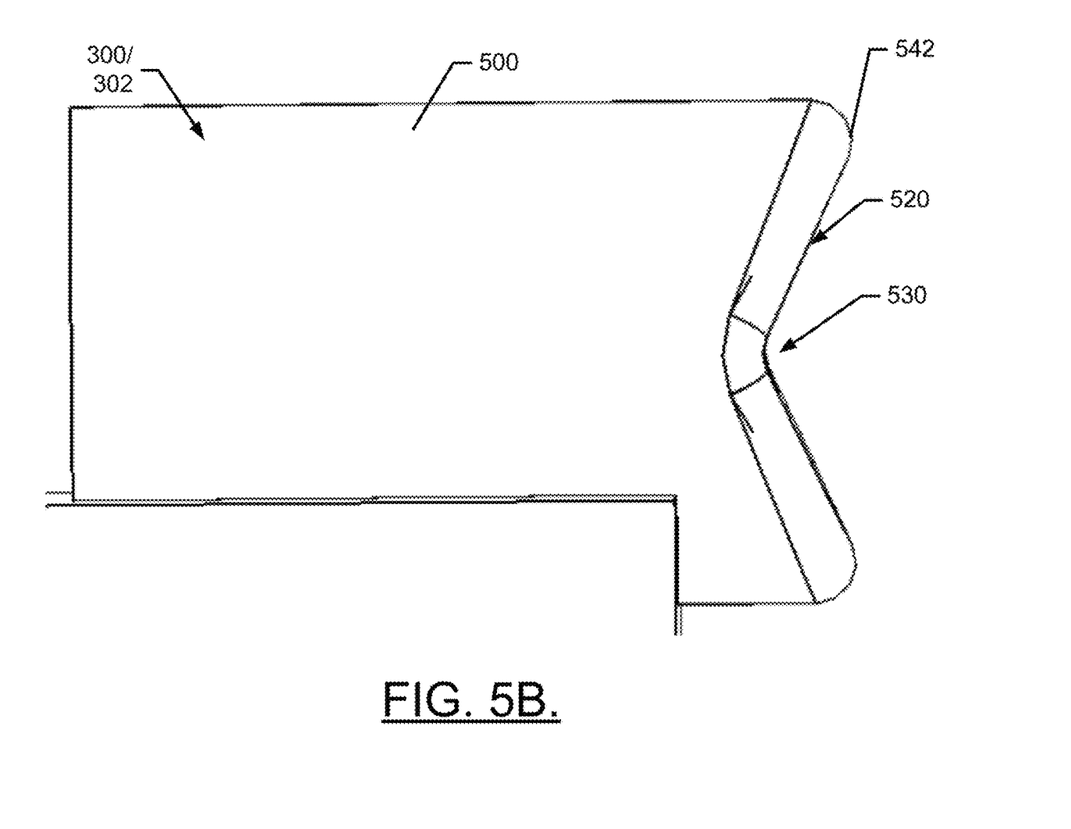
FIG. 5B illustrates a closer side view of the retention body for the kickstand assembly of the measuring device in accordance with an example embodiment.

To achieve the increase in tension associated with transitioning between states, the first and second retention bodies 300 and 302 may be structured accordingly. In this regard, as shown in FIGS. 5A and 5B, the first and second retention bodies 300 and 302 may include a body portion 500. The body portion 500 of this example is substantially cylindrical in shape, and includes an axial channel 510 that passes entirely through the body portion 500 along an axis of the cylindrically shaped body portion 500. However, the first and second retention bodies 300 and 302 could take many different shapes, and need not necessarily be cylindrical (or shaped the same). Thus, the axial channel 510 need not be on an axial centerline of the first and second retention bodies 300 and 302, and indeed may instead be more generally understood to be a retaining channel.

As noted above, the engagement members 340 extend through the axial channel 510 and may pass entirely through the axial channel 510 in some cases. Thus, when assembled, a distal end of the engagement members 340 (relative to the legs 320) may be proximate to one end of the body portion 500 and a proximal end of the engagement members 340 (relative to the legs 320) may be proximate to the opposite end of the body portion 500.

The end of the body portion 500 that is proximate to the distal end of the engagement members 340 could have any shape. However, in an example embodiment, the shape of the end of the body portion 500 that is proximate to the proximal end of the engagement members 340 may have a shape that is tailored to assist in providing the tension associated with transitioning states described above. In this regard, for example, the end of the body portion 500 that is proximate to the proximal end of the engagement members 340 may include a ramp 520 formed thereat. The ramp 520 may extend from a resting channel 530 to an arcuate peripheral edge 540. The resting channel 530 may extend perpendicular to the axial channel 510 to define a diameter of the body portion 500. When the wire member 252 is in the resting channel 530 in either the deployed state or the retracted state, the wire member 252 may be under the lowest (and in some cases no) tension, and therefore be considered to be in a resting condition. Dashed cylinder 550 shows a position of the wire member 252 in the deployed state, and dotted cylinder 560 shows a position of the wire member 252 in the retracted state according to an example embodiment.

In an example embodiment, the arcuate peripheral edge 540 may have a constant radius relative to the axial channel 510. Accordingly, a distance between the resting channels 530 of each of the first and second retention bodies 300 and 302 defines a minimum distance between the legs 320 during a transition between the deployed state and the retracted state. Meanwhile, when the legs 320 are about at a right angle relative to the resting channel 530, the legs will be separated farther by the ramp 520, and the wire member 252 will be under maximum tension that occurs during the transition. Accordingly, when the wire member 252 is transitioned between states, the legs 320 flex outwardly and away from each other under tension as they traverse the arcuate peripheral edge 540 to an apex 542 where the maximum tension is reached. Then (on the other side of the apex 542) tension decreases until the wire member 252 (specifically the legs 320) settle back into the resting channel 530.

The provision of the apex 542 may enable the wire member 252 to be self-positioning in that, if on either side of the apex 542, the wire member 252 will automatically return to the resting channel 530 on the corresponding side of the apex 542. The tension created in the wire member 252 when the transition away from either the deployed state or the retracted state acts as a biasing or spring force to tend to return the wire member 252 to the resting channel 530 in order to relieve the tension. Thus, the operator must apply force at least until past the apex 542 to initiate a transition.

As noted above, the engagement members 340 of this example extend toward each other. Thus, the ramps 520 of the first and second retention bodies 300 and 302 face away from each other. However, if desired, an alternative structure could be employed to reverse the direction of extension. Such an example is shown in FIG. 6.

Figure 6:
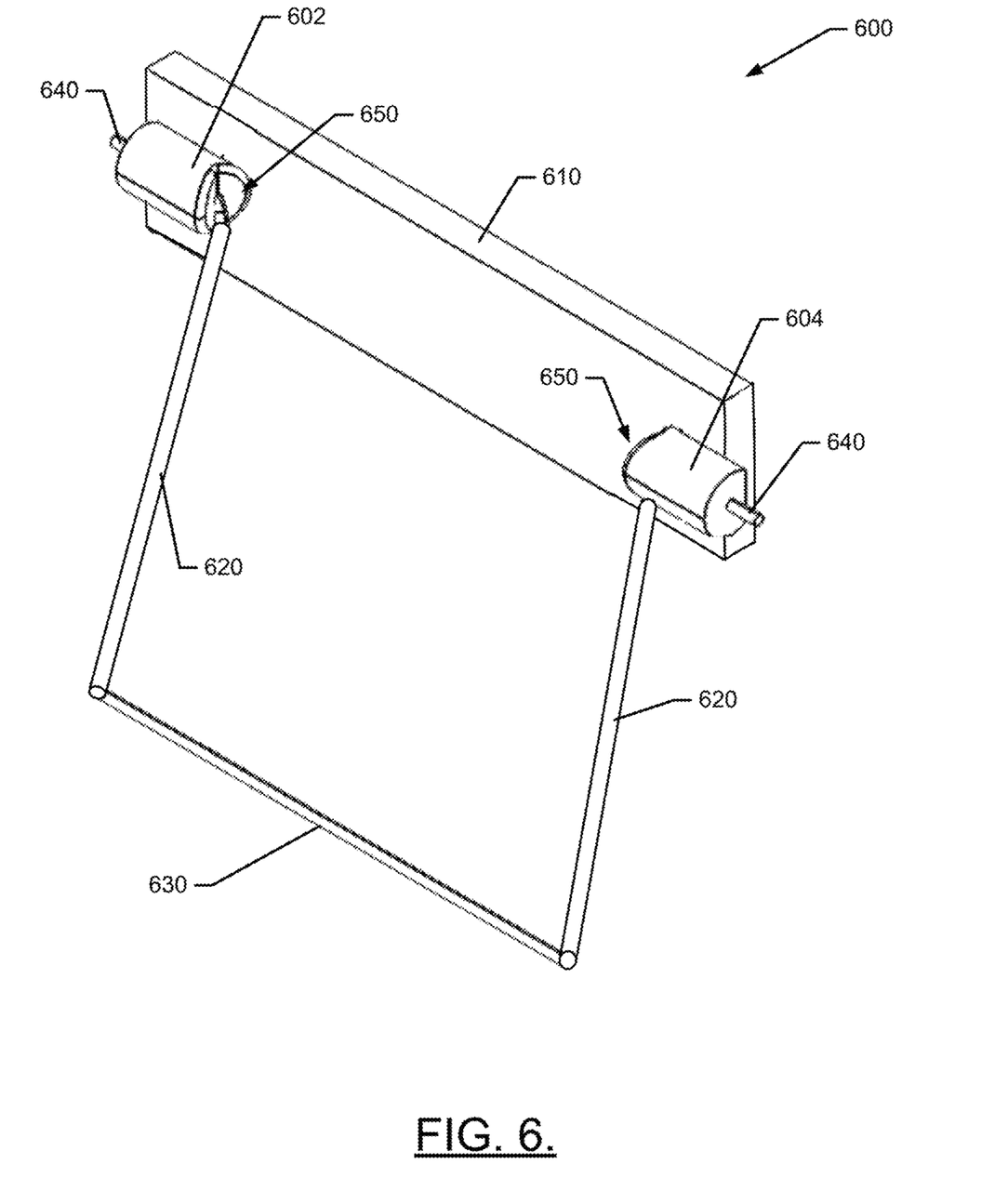
FIG. 6 illustrates a perspective view of an alternative structure for a kickstand assembly in accordance with an example embodiment.

In the example of FIG. 6, a support assembly 600 is shown with an opposite mounting paradigm. The support assembly 600 still includes a first retention body 602 (or boss) and a second retention body 604 (or boss) that may be similarly shaped to the shapes described above for the first and second retention bodies 300 and 302. However, ramp structures 650 of the first and second retention bodies 602 and 604 are swapped in terms of the way they face. The first and second retention bodies 602 and 604 may still be disposed on a base 610 (which as noted above may be separate from and mounted to, or otherwise part of the measuring wheel 200). However, instead of having the ramps 520 face away from each other, the ramp structures 650 face toward each other. This is due to the fact that the wire member of the example of FIG. 6 is formed differently.

The wire member still includes legs 620 connected to each other by rigid angles formed with foot portion 630 at distal ends thereof. However, proximal ends of the legs 620 are connected (again via rigid angles) to engagement members 640 that extend away from each other instead of toward each other. Assembly of the support assembly 600 in this case requires the engagement members 640 to be compressed toward each other (under tension) to fit in between and then through the axial channels formed in the first and second retention bodies 602 and 604. And transition from the deployed state (shown in FIG. 6) to the retracted state also applies tension as described above. However, the tension applied is caused by compression of the legs 620 toward each other as they ride the ramp structures 650 in this example instead of separation of the legs 320, as described above.

Whichever connection paradigm is employed, the support assembly 200 of example embodiments provides a relatively simple structure that is not only cheap and easy to produce, but results in a well performing and more resilient and robust kickstand for the measuring wheel 200. This enables low cost and improved manufacturability. The cost and manufacturability may, in fact, be optimized when the simplest form of the support assembly 250 or 600 is employed. However, some embellishments may be employed without departing from the spirit (and claims) of example embodiments.

In an example embodiment, a support assembly for a measuring device (or such a device including the support assembly) may be provided. The support assembly may include a first retention body, a second retention body, and a wire member having a foot portion, legs and engagement members. The foot portion may extend between distal ends of the legs, and the engagement members may extend from respective proximal ends of the legs. The first and second retention bodies may each include a retaining channel extending at least partially therethrough to receive respective ones of the engagement members. The wire member may be operably coupled to the first and second retention bodies to be transitioned between a retracted state and a deployed state in which the foot member is configured to engage ground upon which the measuring device is operable adjacent to a wheel of the support assembly. The legs and the foot portion may be operably coupled to each other such that tension is increased when the wire member is transitioned between the retracted state and deployed state and is lower in one or both of the retracted state and the deployed state.

In some embodiments, the features of the support assembly described above may be augmented or modified, or additional features may be added. These augmentations, modifications and additions may be optional and may be provided in any combination (expect where such combinations are mutually exclusive of one another). Thus, although some example modifications, augmentations and additions are listed below, it should be appreciated that any of the modifications, augmentations and additions could be implemented individually or in combination with one or more, or even all of the other modifications, augmentations and additions that are listed. As such, for example, a gauge of the wire member may be the same in each of the legs, the foot portion and the engagement members. In an example embodiment, the legs may each form a first angle relative to respective opposing ends of the foot portion. In some cases, the engagement members may each form a second angle relative to the proximal ends of the legs and the first and second angles are supplementary. In an example embodiment, the engagement members may extend toward each other from respective ones of the proximal ends of the legs. In some cases, the engagement members may extend away from each other from respective ones of the proximal ends of the legs. In an example embodiment, the first and second retention bodies may each include a ramp structure at one end thereof. In some cases, the ramp structures of the first and second retention bodies may face toward each other. In an example embodiment, the ramp structures of the first and second retention bodies may face away from each other. In some cases, the ramp structures may be formed between an arcuate peripheral edge and a resting channel in which the wire member is retained in each of the deployed and retracted states. The arcuate peripheral edge may have a constant radius extending away from the retaining channel, and maximum tension may be achieved when the wire member is transitioned between the retracted state and deployed state and engages an apex of the arcuate peripheral edge.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A support assembly for a measuring device, the support assembly comprising:
    a first retention body;
    a second retention body; and a wire member having a foot portion, legs and engagement members, the foot portion extending between distal ends of the legs, and the engagement members extending from respective proximal ends of the legs, wherein the first and second retention bodies each include a retaining channel extending at least partially therethrough to receive respective ones of the engagement members, wherein the wire member is operably coupled to the first and second retention bodies to be transitioned between a retracted state and a deployed state in which the foot portion is configured to engage ground upon which the measuring device is operable adjacent to a wheel of the support assembly, wherein the legs and the foot portion are operably coupled to each other such that tension is increased when the wire member is transitioned between the retracted state and deployed state and is lower in one or both of the retracted state and the deployed state, and wherein the first and second retention bodies each include a ramp structure at one end thereof.

2. The support assembly of claim 1, wherein a gauge of the wire member is the same in each of the legs, the foot portion and the engagement members.

3. The support assembly of claim 1, wherein the legs each form a first angle relative to respective opposing ends of the foot portion.

4. The support assembly of claim 3, wherein the engagement members each form a second angle relative to the proximal ends of the legs and the first and second angles are supplementary.

5. The support assembly of claim 1, wherein the engagement members extend toward each other from respective ones of the proximal ends of the legs.

6. The support assembly of claim 1, wherein the engagement members extend away from each other from respective ones of the proximal ends of the legs.

7. The support assembly of claim 1, wherein the ramp structures of the first and second retention bodies face toward each other.

8. The support assembly of claim 1, wherein the ramp structures of the first and second retention bodies face away from each other.

9. The support assembly of claim 1, wherein the ramp structures are formed between an arcuate peripheral edge and a resting channel in which the wire member is retained in each of the deployed and retracted states, wherein the arcuate peripheral edge has a constant radius extending away from the retaining channel, and wherein maximum tension is achieved when the wire member is transitioned between the retracted state and deployed state and engages an apex of the arcuate peripheral edge.

10. A measuring wheel comprising a handle, a wheel operably coupled to the handle via a hub assembly, and a support assembly, wherein the support assembly comprises:

a first retention body;

a second retention body; and a wire member having a foot portion, legs and engagement members, the foot portion extending between distal ends of the legs, and the engagement members extending from respective proximal ends of the legs, wherein the first and second retention bodies each include a retaining channel extending at least partially therethrough to receive respective ones of the engagement members, wherein the wire member is operably coupled to the first and second retention bodies to be transitioned between a retracted state and a deployed state in which the foot portion is configured to engage ground upon which the measuring device is operable adjacent to a wheel of the support assembly, wherein the legs and the foot portion are operably coupled to each other such that tension is increased when the wire member is transitioned between the retracted state and deployed state and is lower in one or both of the retracted state and the deployed state, and wherein the first and second retention bodies each include a ramp structure at one end thereof.

11. The measuring wheel of claim 10, wherein a gauge of the wire member is the same in each of the legs, the foot portion and the engagement members.

12. The measuring wheel of claim 10, wherein the legs each form a first angle relative to respective opposing ends of the foot portion.

13. The measuring wheel of claim 12, wherein the engagement members each form a second angle relative to the proximal ends of the legs and the first and second angles are supplementary.

14. The measuring wheel of claim 10, wherein the engagement members extend toward each other from respective ones of the proximal ends of the legs.

15. The measuring wheel of claim 10, wherein the engagement members extend away from each other from respective ones of the proximal ends of the legs.

16. The measuring wheel of claim 10, wherein the ramp structures of the first and second retention bodies face toward each other.

17. The measuring wheel of claim 10, wherein the ramp structures of the first and second retention bodies face away from each other.

18. The measuring wheel of claim 10, wherein the ramp structures are formed between an arcuate peripheral edge and a resting channel in which the wire member is retained in each of the deployed and retracted states, wherein the arcuate peripheral edge has a constant radius extending away from the retaining channel, and wherein maximum tension is achieved when the wire member is transitioned between the retracted state and deployed state and engages an apex of the arcuate peripheral edge.

19. A support assembly for a measuring device, the support assembly comprising:

a first retention body;

a second retention body; and a wire member having a foot portion, legs and engagement members, the foot portion extending between distal ends of the legs, and the engagement members extending from respective proximal ends of the legs, wherein the first and second retention bodies each include a retaining channel extending at least partially therethrough to receive respective ones of the engagement members, wherein the wire member is operably coupled to the first and second retention bodies to be transitioned between a retracted state and a deployed state in which the foot portion is configured to engage ground upon which the measuring device is operable adjacent to a wheel of the support assembly, wherein the legs and the foot portion are operably coupled to each other such that tension is increased when the wire member is transitioned between the retracted state and deployed state and is lower in one or both of the retracted state and the deployed state, and wherein a gauge of the wire member is the same in each of the legs, the foot portion and the engagement members.

\* \* \* \* \*